(12) United States Patent
Huang et al.

(10) Patent No.: US 8,858,035 B2
(45) Date of Patent: Oct. 14, 2014

(54) BACKLIGHT MODULE AND LIQUID CRYSTAL DISPLAY DEVICE USING SAME

(75) Inventors: Chong Huang, Guandong (CN); Zexin Wu, Guandong (CN); Yuchun Hsiao, Guandong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 77 days.

(21) Appl. No.: 13/643,087

(22) PCT Filed: Sep. 6, 2012

(86) PCT No.: PCT/CN2012/081080
§ 371 (c)(1),
(2), (4) Date: Oct. 24, 2012

(87) PCT Pub. No.: WO2014/032325
PCT Pub. Date: Mar. 6, 2014

(65) Prior Publication Data
US 2014/0063789 A1    Mar. 6, 2014

(30) Foreign Application Priority Data
Aug. 31, 2012 (CN) .......................... 2012 1 0317933

(51) Int. Cl.
| | |
|---|---|
| *F21V 23/00* | (2006.01) |
| *F21V 29/00* | (2006.01) |
| *G09F 13/04* | (2006.01) |
| *G02F 1/1335* | (2006.01) |

(52) U.S. Cl.
CPC ...... *G02F 1/133604* (2013.01); *F21V 29/2293* (2013.01); *G09F 13/04* (2013.01)
USPC ....... 362/294; 362/373; 362/633; 362/249.01

(58) Field of Classification Search
CPC ....... G09F 13/18; G09F 13/04; G02F 1/1333; F21V 8/00; F21V 7/04; F21V 29/00; F21V 15/01; F21V 21/005; F21V 7/20
USPC ............... 362/33, 97.1–97.3, 249.01, 249.02, 362/294, 373, 555, 561, 600, 609, 611–615, 362/623, 632–634, 800, 812; 349/58, 61, 349/62, 65, 161; 40/546, 549–552, 564
See application file for complete search history.

(56) References Cited

U.S. PATENT DOCUMENTS

| | | | | |
|---|---|---|---|---|
| 7,452,109 | B2 * | 11/2008 | Noh et al. ...................... | 362/294 |
| 7,703,941 | B2 * | 4/2010 | Lee ................. | 362/219 |
| 7,710,531 | B2 * | 5/2010 | Kurokawa et al. ............ | 349/161 |
| 8,075,150 | B2 * | 12/2011 | Maruyama ................... | 362/97.1 |

(Continued)

*Primary Examiner* — Hargobind S Sawhney
(74) *Attorney, Agent, or Firm* — Andrew C. Cheng

(57) ABSTRACT

The present invention discloses a backlight module, which includes a light source and an aluminum extrusion. The aluminum extrusion forms at least one thermal chamber. The thermal chamber is a penetrating hollow structure having an opening. The present invention also discloses a liquid crystal display device having the backlight module. Practicing the backlight module of the present invention and the liquid crystal display device using the backlight module allows a channel for air flow to be formed in the interior of the thermal chamber to enhance heat dissipation performance, eliminate the operations of forming a light bar through packaging the light source and an MCPCB and bonding the light bar to the aluminum extrusion, decrease thermal resistance interface, and saves assembling material.

19 Claims, 2 Drawing Sheets

(56) References Cited

U.S. PATENT DOCUMENTS

| | | | |
|---|---|---|---|
| 8,562,200 B2* | 10/2013 | Park | 362/633 |
| 8,573,811 B2* | 11/2013 | Lin et al. | 362/294 |
| 8,764,220 B2* | 7/2014 | Chan et al. | 362/217.02 |
| 2007/0047229 A1* | 3/2007 | Lee | 362/237 |
| 2007/0047243 A1* | 3/2007 | Hacker et al. | 362/382 |
| 2008/0304288 A1* | 12/2008 | Iwasaki | 362/632 |
| 2012/0014135 A1* | 1/2012 | Kim | 362/623 |
| 2012/0092873 A1* | 4/2012 | Chang | 362/294 |
| 2012/0127749 A1* | 5/2012 | Kuo et al. | 362/600 |
| 2012/0300492 A1* | 11/2012 | Zhang | 362/602 |
| 2013/0114290 A1* | 5/2013 | Lee | 362/602 |

* cited by examiner

BACKLIGHT MODULE AND LIQUID CRYSTAL DISPLAY DEVICE USING SAME

CROSS REFERENCE TO RELATED APPLICATIONS

This application claims the priority of Chinese Patent Application No. 201210317933.4 filed on Aug. 31, 2012, the disclosure of which is incorporated herein by reference in its entirety.

BACKGROUND OF THE INVENTION

1. Field of the Invention

The present invention relates to the field of liquid crystal displaying, and in particular to a backlight module and a liquid crystal display device using the backlight module.

2. The Related Arts

A liquid crystal display device comprises a display module. To display an image with the display module, backlighting serving as a light source is needed. The backlight light source that is conventionally used comprises CCFL (Cold Cathode Fluorescent Lamp) and LED (Light-Emitting Diode). Currently, LEDs are used as a novel light source, which shows the advantages of high brightness and low power consumption. Consequently, the LED backlighting is getting prevailing and is considered a trend of future design. However, LEDs also generate a large amount of heat. To ensure the light emission efficiency and the lifespan of the LEDs, an arrangement of heat dissipation must be provided for the LEDs.

The currently adopted heat dissipation solution generally comprises backplane heat dissipation and aluminum extrusion (which is a heat dissipation structure formed through extruding aluminum) heat dissipation. The backplane heat dissipation requires a backplane to be entirely made of aluminum or an aluminum alloy and is thus of high cost, making it opposite to a design requirement of low cost, so that it is not commonly adopted. As shown in FIG. 3, aluminum extrusion heat dissipation refers to packaging LEDs 7 on a MCPCB (Metal Core Printed Circuit Board) to form an LED light bar and bonding the LED light bar to an aluminum extrusion 8 by thermally conductive adhesives, with the aluminum extrusion 8 being positioned on a backplane 9. A backlight module having such a structure suffers the following disadvantages:

(1) Packaging must be carried out on the LEDs and the MCPCB in order to make a light bar and additional operation is needed to bond the light bar to the aluminum extrusion 8; this costs working hours and materials.

(2) Structure is complicated, making thermal resistance interfaces increased and thus adverse to enhancement of heat dissipation performance.

SUMMARY OF THE INVENTION

The technical issue to be addressed by the present invention is to provides a backlight module and a liquid crystal display device using the backlight module, in which a channel for air flow is formed inside a thermal chamber to enhance heat dissipation performance and also to eliminate the operations of forming a light bar through packaging a light source and a MCPCB and bonding the light bar to an aluminum extrusion, decreasing thermal resistance interface, and saving materials for assembling.

To address the above technical issue, an embodiment of the present invention provides a backlight module, which comprises a light source and an aluminum extrusion. The light source is mounted to the aluminum extrusion. The aluminum extrusion forms at least one thermal chamber. The thermal chamber is a penetrating hollow structure having an opening.

Preferably, the light source is mounted to an outside surface of the thermal chamber.

Preferably, the aluminum extrusion comprises an extension plate that expands a contact area with surrounding air. The extension plate extends from one surface of the thermal chamber.

Preferably, the extension plate has two opposite side edges that are respectively flush with two opposite open ends of the thermal chamber.

Preferably, the extension plate has a surface on which a coating of heat dissipation paint is sprayed or a heat dissipation layer capable of radiation heat dissipation is formed.

Preferably, the extension plate comprises a horizontal plate section and a vertical plate section that are substantially parallel to each other. One of the horizontal plate section and the vertical plate section is unitarily jointed to a backplane of the backlight module.

Preferably, the thermal chamber has a rectangular cross-section.

Preferably, the thermal chamber has a surface on which a coating of heat dissipation paint is sprayed or a heat dissipation layer capable of radiation heat dissipation is formed.

The present invention provides a backlight module and a liquid crystal display device using the backlight module. The backlight module comprises a light source and an aluminum extrusion. The aluminum extrusion forms at least one thermal chamber that has a penetrating hollow structure having openings. LEDs of the light source are directly packaged on an outside surface of the thermal chamber. The backlight module forms a channel for air flow in the interior of the thermal chamber to enhance heat dissipation performance, eliminate the operations of forming a light bar through packaging the light source and an MCPCB and bonding the light bar to the aluminum extrusion, decrease thermal resistance interface, and saves assembling material.

DETAILED DESCRIPTION OF THE PREFERRED EMBODIMENTS

A description will be given to preferred embodiments of the present invention, reference being had to the attached drawings.

The present invention provides a backlight module, which comprises a light source 1 and an aluminum extrusion 2. The light source 1 is mounted to the aluminum extrusion 2. The aluminum extrusion 2 forms at least one thermal chamber 21. The thermal chamber 21 is a penetrating hollow structure having open ends.

The backlight module of the present invention uses an arrangement of thermal chamber 21 inside which a channel for air flow is formed to improve flowability of air so as to allow heat received by the aluminum extrusion 2 to be efficiently transmitted outside through the thermal chamber 21.

Further, the hollow structure of the thermal chamber 21 also provides an effect of increasing the contact surface area between the aluminum extrusion 2 and the surrounding air to facilitate more efficient dissipation of heat from the backlight module. The structure of the backlight module will be described as follows.

First Embodiment

Figure 1:
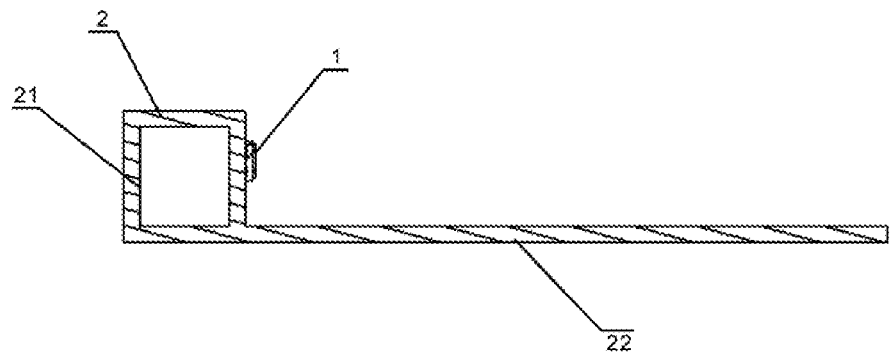
FIG. 1 is a cross-sectional view of a portion of a backlight module according a first embodiment of the present invention.

Referring to FIG. 1, the backlight module comprises a light source 1 and an aluminum extrusion 2. The light source 1 is mounted to the aluminum extrusion 2. The aluminum extrusion 2 comprises a thermal chamber 21 and an extension plate 22. The thermal chamber 21 is formed by being delimited by four side walls connected edge by edge and has a cross-section that is rectangular. The thermal chamber 21 has two opposite ends that form openings and defines therein a hollow column-like air flow channel. The light source 1 is directly mounted to an outside surface of one of the side walls of the thermal chamber 21.

In practicing the backlight module of the present invention, the heat generated by LEDs of the light source is transmitted through the side wall of the thermal chamber 21 into the interior of the thermal chamber 21. Due to the openings formed in the opposite ends of the thermal chamber 21, the air contained inside the thermal chamber 21, when being heated, gets thinner and causes a flow in a constant direction. Under this condition, the interior of the thermal chamber 21 forms a channel for the air flow to accelerate the dissipation of heat therefrom. During such a process, the four side walls of the thermal chamber 21 are also involved in the conduction of heat, thereby increasing the contact surface area of the entire aluminum extrusion with the surrounding air and realizing high performance of heat dissipation.

Enhancing heat dissipation performance with the arrangement of thermal chamber 21 also enable the elimination of the operations of forming an LED light bar through packaging the LEDs of the light source 1 and the MCPCB and bonding the LED light bar to the aluminum extrusion due to the improvement of the heat dissipation performance, thereby saving assembling material. The LEDs of the light source are directly packaged on an outside surface of the thermal chamber 21, which decrease thermal resistance interface to provide an effect of assisting heat dissipation.

Preferably, a coating of heat dissipation paint or a heat dissipation layer capable of radiation heat dissipation (not shown) can be sprayed on the outside surface of the thermal chamber 21 to accelerate the dissipation of heat and achieve bettered result of heat dissipation.

The purpose of making the cross-section of the thermal chamber 21 rectangular in the above embodiment is that the surface area of an aluminum extrusion having a rectangular cross-section is greater than the surface area of an aluminum extrusion having a cross-section of different shape when the amount of material used is the same. This increases the heat dissipation area of the aluminum extrusion and ensures the strength of the aluminum extrusion. It is apparent that the thermal chamber 21 can be arranged to show a cross-section of different shape, such as circle and polygon that is commonly used, and this also achieves the enhanced result of heat dissipation.

The extension plate 22 extends from a surface of the four side walls of the thermal chamber 21 and functions to expand the contact area between the aluminum extrusion and the surrounding air for accelerating the dissipation of heat.

Preferably, to provide the best performance of heat dissipation for the extension plate 22, opposite side edges of the extension plate 22 are set flush with the opposite open ends of the thermal chamber 21 respectively. Alternatively, surfaces of the extension plate 22 are entirely (or partly) coated with heat dissipation paint or a heat dissipation layer (not shown) capable of radiation heat dissipation.

Second Embodiment

Figure 2:
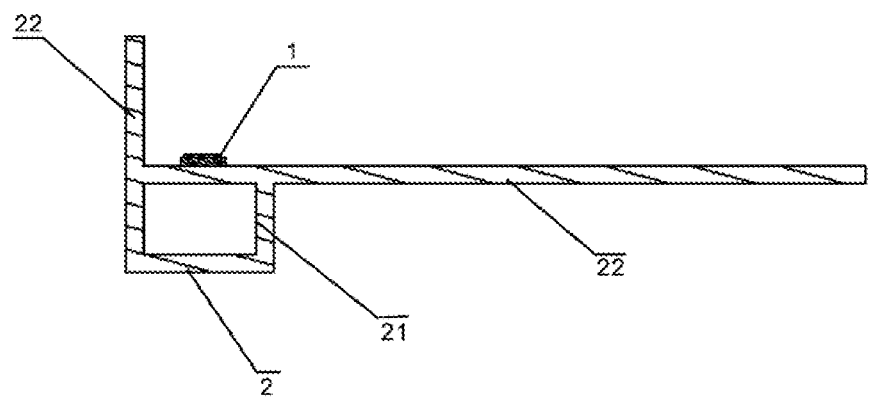
FIG. 2 is a cross-sectional view of a portion of a backlight module according a second embodiment of the present invention.
Figure 3:
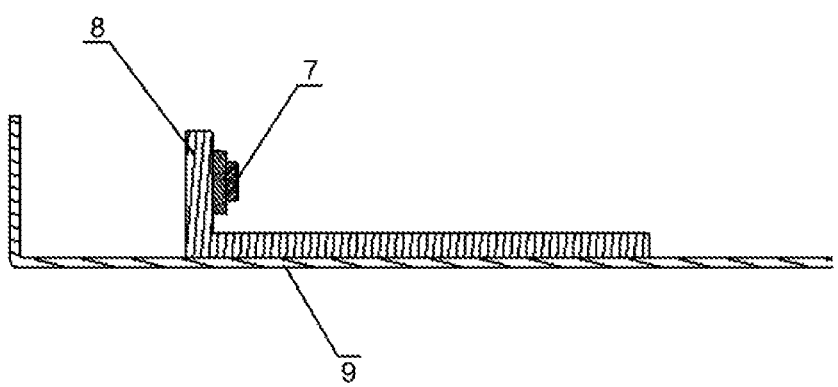
FIG. 3 is a cross-sectional view of a portion of a conventional backlight module.

Referring to FIG. 2, the instant embodiment shows application of an aluminum extrusion that forms a thermal chamber 21 to a direct type backlight module. A difference between the instant embodiment and the first embodiment is that the extension plate 22 comprises a horizontal plate section and a vertical plate section that are substantially perpendicular to each other. The LEDs of a light source is an outside surface of the thermal chamber 21 that is located on the same plane as the horizontal plate section as shown in the drawing. Besides providing an effect of enhancing heat dissipation performance, the horizontal plate section arranged in this embodiment also serve as a connection member that connects with a backplane of the backlight module. Thus, with the horizontal plate section jointed to the backplane of the backlight module, a requirement for lowering cost can be achieved.

In other embodiments of the backlight module of the present invention, the number of the thermal chamber can be plural according to the design requirement of practical application and the thermal chamber can be of a single open end or more than two open ends according to the practical needs of heat dissipation, provided the thermal chamber is a penetrating hollow structure having openings.

The present invention also provides a liquid crystal display device, which comprises a backlight module according to one or more of the embodiments described above. Specific details of embodying will be omitted.

Practicing a backlight module according to the present invention and a liquid crystal display device using the backlight module provides the following beneficial efficacies. The backlight module comprises a light source and an aluminum extrusion. The aluminum extrusion forms at least one thermal chamber that has a penetrating hollow structure having openings. LEDs of the light source are directly packaged on an outside surface of the thermal chamber. The backlight module forms a channel for air flow in the interior of the thermal chamber to enhance heat dissipation performance, eliminate the operations of forming a light bar through packaging the light source and an MCPCB and bonding the light bar to the aluminum extrusion, decrease thermal resistance interface, and saves assembling material.

What is claimed is:

1. A backlight module, comprising a light source and an aluminum extrusion, wherein the aluminum extrusion forms at least one thermal chamber, the thermal chamber being a penetrating hollow structure having an opening wherein the light source is mounted to an outside surface of the thermal chamber,
   wherein the aluminum extrusion comprises an extension plate that expands a contact area with surrounding air, the extension plate extending from one surface of the thermal chamber, and
   wherein the extension plate comprises a horizontal plate section and a vertical plate section that are substantially perpendicular to each other.

2. The backlight module as claimed in claim 1, wherein the light source is mounted to an outside surface of the thermal chamber.

3. The backlight module as claimed in claim 1, wherein the aluminum extrusion comprises an extension plate that expands a contact area with surrounding air, the extension plate extending from one surface of the thermal chamber.

4. The backlight module as claimed in claim 1, wherein the extension plate has two opposite side edges that are respectively flush with two opposite open ends of the thermal chamber.

5. The backlight module as claimed in claim 4, wherein the extension plate has a surface on which a coating of heat dissipation paint is sprayed or a heat dissipation layer capable of radiation heat dissipation is formed.

6. The backlight module as claimed in claim 3, wherein the extension plate comprises a horizontal plate section and a vertical plate section that are substantially perpendicular to each other.

7. The backlight module as claimed in claim 1, wherein the thermal chamber has a rectangular cross-section.

8. The backlight module as claimed in claim 1, wherein the thermal chamber has a surface on which a coating of heat dissipation paint is sprayed or a heat dissipation layer capable of radiation heat dissipation is formed.

9. A liquid crystal display device comprising a backlight module, wherein the backlight module comprises a light source and an aluminum extrusion, wherein the aluminum extrusion forms at least one thermal chamber, the thermal chamber being a penetrating hollow structure having an opening wherein the light source is mounted to an outside surface of the thermal chamber,
wherein the aluminum extrusion comprises an extension plate that expands a contact area with surrounding air, the extension plate extending from one surface of the thermal chamber, and
wherein the extension plate comprises a horizontal plate section and a vertical plate section that are substantially perpendicular to each other.

10. The liquid crystal display device as claimed in claim 9, wherein the light source is mounted to an outside surface of the thermal chamber.

11. The liquid crystal display device as claimed in claim 9, wherein the aluminum extrusion comprises an extension plate that expands a contact area with surrounding air, the extension plate extending from one surface of the thermal chamber.

12. The liquid crystal display device as claimed in claim 9, wherein the extension plate has two opposite side edges that are respectively flush with two opposite open ends of the thermal chamber.

13. The liquid crystal display device as claimed in claim 12, wherein the extension plate has a surface on which a coating of heat dissipation paint is sprayed or a heat dissipation layer capable of radiation heat dissipation is formed.

14. The liquid crystal display device as claimed in claim 11, wherein the extension plate comprises a horizontal plate section and a vertical plate section that are substantially perpendicular to each other.

15. The liquid crystal display device as claimed in claim 9, wherein the thermal chamber has a rectangular cross-section.

16. The liquid crystal display device as claimed in claim 9, wherein the thermal chamber has a surface on which a coating of heat dissipation paint is sprayed or a heat dissipation layer capable of radiation heat dissipation is formed.

17. A liquid crystal display device comprising a backlight module, wherein the backlight module comprises a light source and an aluminum extrusion, the aluminum extrusion forming at least one thermal chamber, the thermal chamber being a penetrating hollow structure having an opening, the aluminum extrusion comprising an extension plate that expands a contact area with surrounding air, the extension plate extending from one surface of the thermal chamber;
the light is mounted to an outside surface of the aluminum extrusion wherein the extension plate comprises a horizontal plate section and a vertical plate section that are substantially perpendicular to each other.

18. The liquid crystal display device as claimed in claim 17, wherein the extension plate has a surface on which a coating of heat dissipation paint is sprayed or a heat dissipation layer capable of radiation heat dissipation is formed.

19. The liquid crystal display device as claimed in claim 17, wherein the thermal chamber has a rectangular cross-section.

* * * * *